Patented Sept. 1, 1953

2,650,641

UNITED STATES PATENT OFFICE 2,650,641

METHOD FOR RENDERING A PNEUMATIC TIRE INNER TUBE SUBSTANTIALLY STATIC-FREE

Herbert D. Hiatt, Indianapolis, Georgie P. McCord, Oklandon, and Lester C. Peterson, Indianapolis, Ind., assignors to United States Rubber Company, New York, N. Y., a corporation of New Jersey No Drawing. Application January 11, 1950, Serial No. 138,072

3 Claims. (Cl. 154—14)

This invention relates to an improved method for the control of static in pneumatic tire assemblies. More particularly the invention relates to the treatment of the interior of a rubber inner tube with electrically conductive carbon black in admixture with a volatile liquid.

When a conventional automobile tire moves over a road surface, a static electrical charge may be generated. This static charge accumulates on the tire until a relatively high potential difference exists between the road and the automobile, and may ultimately result in a spontaneous discharge. Such a spontaneous discharge is highly objectionable not only because it interferes with clear automobile radio reception, but the discharge also generates ozone, which is deleterious to the rubber inner tube and tire, causing rapid deterioration of the rubber, as evidenced by scorching and cracking thereof. Also, a person in contact with the road receives an electric shock upon touching the automobile while such a charge is present. Passengers boarding busses are sometimes subjected to such shock.

It is know to overcome the foregoing difficulties by decreasing the electrical resistance of the pneumatic tire, by making certain parts thereof of conductive rubber, or by applying dry, finely powdered conductive carbon black to the interior of the tire carcass, or to the inner tube. The static charges flow through the conductive areas of the tire to the ground, thereby preventing high potentials from building up at any point on the tire.

It is an object of the present invention to provide an improved method of applying conductive carbon black to the inside of an inner tube with a maximum of convenience.

Another object is the provision of a method of applying conductive carbon black to the inside of an inner tube during the manufacture thereof without the necessity for appreciable extra handling of the inner tube, so that the labor cost of the carbon black application is maintained at a minimum.

Other objects and advantages will be made evident in the following detailed description of the invention.

The improved method of the present invention for the reduction of static in pneumatic tires employs any of those types of carbon black known as electrically conductive carbon black, usually acetylene black or high abrasive furnace black, in uniform admixture with a volatile liquid which does not have appreciable solvent action on, or otherwise adversely affect, the rubber of the tire, and which will evaporate without interfering with the usual manufacturing operations on the tire.

The conductive carbon black powder is preferably mixed with sufficient of the volatile material to form a uniform paste of grease-like consistency. Generally from 3 to 30 parts by weight of conductive carbon black and correspondingly from 97 to 70 parts by weight of the volatile liquid forms suitable mixtures, although it is usually preferred to employ approximately 10 to 20 parts of conductive black and correspondingly 90 to 80 parts of the liquid, in order to obtain the optimum consistency in the paste.

The preferred volatile liquids are the organic liquids of relatively low boiling point, especially the lower alkanols, viz., methyl (B. P. 64° C.) ethyl (B. P. 78° C.) and isopropyl (B. P. 82° C.) alcohols. Isopropyl alcohol is especially preferred. Liquids boiling below 85° C. are preferred. Other suitable organic liquids include ketones, e. g., acetone (B. P. 56° C.), methyl ethyl ketone (B. P. 79.6° C.); esters, e. g., ethyl acetate (B. P. 77.1° C.); aldehydes, e. g., butyraldehyde (B. P. 74.7° C.), or other liquids which do not have appreciable solvent action on uncured inner tube stock, since it is preferred, as will be explained below, to apply the paste to the interior of the inner tube before it is vulcanized. Although water may be used in preparing the paste of this invention, it is not generally preferred because its relatively high boiling gives rise to a tendency to production of a relatively uncured area in the tube where the paste was applied thereto. Liquids composed partly of water, e. g., a mixture of 25% water and 75% ethyl alcohol, are suitable. The mixture of conductive black and volatile liquid may be prepared by tumbling the materials in a rotating drum or by otherwise mixing in any suitable mixer.

The invention contemplates application of a paste of the foregoing character to the interior of a tire, particularly to the interior of an inner tube, in amount sufficient to deposit thereon a thin coating of conductive carbon black. For this purpose, the quantity of paste applied, for example, to a tube for a 6.00–16 size tire, may be from about 3 to 5 grams, depending on the relative proportion of conductive carbon black and volatile liquid in the paste. Such paste is conveniently applied to the interior of the inner tube by squirting or blowing it into the tube, as by means of a grease gun or air gun.

The paste is advantageously introduced into the tube while the tube is in the process of manufacture, before vulcanization and before the end of the tube is spliced together. After the tube is spliced and valve stem is in place, the tube containing the paste may be shaped on the usual forming drum and vulcanized in the conventional manner. This is usually accomplished by inflating the tube with a suitable fluid such as air while confining and heating the tube in a mold. At the conclusion of the vulcanization the inflating medium is vented from the tube through the valve stem while the tube is still in the heated mold. During such venting, the volatile liquid from the paste is expelled from the hot tube in the form of a vapor. This leaves on the inside of the tube a residue of conductive carbon black in its original powdered state, that is to say, the carbon black is in its original free powdered form devoid of any binding material or matrix. This powdered residue becomes distributed evenly over the interior surface of the tube when the tube is put into service, and remains adhered to the inner surface of the tube in a substantially continuous conducting film throughout the life of the tube.

The method of the present invention is highly advantageous in that the employment of conductive carbon black in the form of a paste or grease permits application of the carbon black to the inner tube without any material additional labor or handling of the tube. Thus, a supply of the conductive carbon black paste can be maintained in a pressure-operated gun at a suitable station on the inner tube manufacturing assembly line, such as the point at which the tube splice is made and the valve applied. The operator merely inserts the nozzle of the gun into the open end of the tube and injects the desired amount of paste. There is no additional handling of the tube, and there is no possibility of creation of a nuisance by having carbon black dust drift about the plant to the annoyance and inconvenience of the personnel, and soiling equipment and materials.

As indicated previously, the volatile liquid employed in making the paste should not have any great solvent action on the rubber, otherwise when the uncured tube is shaped on the forming drum bulging and thinning of the tube wall will take place in the area where the paste is located. Also, since the time of vulcanization of the tube is relatively short, e. g., usually about five minutes, the liquid must be readily volatile, otherwise an appreciable part of the heat supplied in the curing mold may be spent in volatilizing the liquid with the result that an uncured spot may be left on the tube in the area where the paste was applied. For this reason liquids boiling below 85° C., usually in the range 45° C. to 85° C., are preferred. If higher boiling liquids, such as water, are employed it is advisable to increase the vulcanization or heating time to avoid formation of an uncured spot.

Having thus described our invention, what we claim and desire to protect by Letters Patent is:

1. A method of rendering an inner tube for a pneumatic tire substantially static-free which comprises squirting a charge consisting of electrically conductive carbon black in uniform admixture with a volatile liquid in which rubber is insoluble locally into the interior of a raw inner tube before splicing the same, subsequently splicing the tube and heating the same to effect vulcanization, said heat of vulcanization serving to volatilize said liquid, and venting the vapor from the still hot tube, thereby leaving a deposit of dry conductive carbon black powder, devoid of binding matrix, on the interior surface of the tube which becomes distributed from the area where the charge was originally squirted into the raw tube and becomes uniformly spread over the entire interior surface of the tube to form a conductive layer thereon in subsequent handling and use of the tube.

2. A method of rendering a rubber inner tube for a pneumatic tire substantially static-free which comprises injecting a paste consisting of electrically conductive carbon black in uniform admixture with a volatile organic liquid having a boiling point within the range of from 45° C. to 85° C. in which rubber is insoluble locally into the interior of a raw inner tube before splicing the same, subsequently splicing the tube and heating the same to effect vulcanization, said heat of vulcanization serving to volatilize said liquid, and venting the vapor from the still hot tube, thereby leaving a deposit of dry conductive carbon black in a freely powdered state, devoid of binding matrix, on the interior surface of the tube which becomes distributed from the area where the paste was originally injected into the raw tube and becomes uniformly spread over the entire surface of the tube to form a conductive layer thereon in subsequent handling and use of the tube.

3. A method of rendering an inner tube for a pneumatic tire substantially static-free which comprises squirting a charge of a paste consisting of 10 to 20 parts by weight of electrically conductive carbon black in uniform admixture with 90 to 80 parts by weight of isopropyl alcohol in which rubber is insoluble locally into the open end of a raw inner tube before splicing the same, subsequently splicing the tube and heating the same to effect vulcanization, said heat of vulcanization serving to volatilize said liquid, and venting the vapor from the still hot tube, thereby leaving a deposit of dry conductive carbon black powder free from binding material on the interior surface of the tube which becomes distributed from the area where the paste was originally squirted into the raw tube and becomes uniformly spread over the entire interior surface of the tube to form a conductive layer thereon in subsequent handling and use of the tube.

HERBERT D. HIATT.
GEORGIE P. McCORD.
LESTER C. PETERSON.

References Cited in the file of this patent

UNITED STATES PATENTS

| Number | Name | Date |
| --- | --- | --- |
| 1,245,700 | Geer | Nov. 6, 1917 |
| 1,354,174 | Dech | Sept. 28, 1920 |
| 1,377,729 | Ray | May 10, 1921 |
| 1,889,429 | Wiegand | Nov. 29, 1932 |
| 1,905,365 | Carlin | Apr. 25, 1933 |
| 2,194,392 | Keeton | Mar. 19, 1940 |
| 2,242,264 | Roberts | May 20, 1941 |
| 2,290,670 | Bull | July 21, 1942 |
| 2,427,238 | Swart | Sept. 9, 1947 |
| 2,428,478 | Thurber | Oct. 7, 1947 |
| 2,531,541 | Spicer | Nov. 28, 1950 |

FOREIGN PATENTS

| Number | Country | Date |
| --- | --- | --- |
| 595,745 | Great Britain | Dec. 15, 1947 |